(12) United States Patent
Bazile

(10) Patent No.: US 8,265,802 B2
(45) Date of Patent: Sep. 11, 2012

(54) METHOD AND DEVICE FOR DETERMINING THE DYNAMIC STABILITY MARGIN OF AN AIRCRAFT

(75) Inventor: Jerome Bazile, Brax (FR)

(73) Assignee: Airbus Operations SAS, Toulouse (FR)

( * ) Notice: Subject to any disclaimer, the term of this patent is extended or adjusted under 35 U.S.C. 154(b) by 1063 days.

(21) Appl. No.: 12/130,470

(22) Filed: May 30, 2008

(65) Prior Publication Data

US 2009/0043432 A1    Feb. 12, 2009

(30) Foreign Application Priority Data

Jun. 1, 2007   (FR) .................................... 07 55399

(51) Int. Cl.
*G01C 23/00* (2006.01)
(52) U.S. Cl. ............................................................ 701/3
(58) Field of Classification Search .................. 701/3, 4, 701/7, 14, 400, 408; 244/75.1, 177
See application file for complete search history.

(56) References Cited

U.S. PATENT DOCUMENTS

| 2,958,483 | A | * | 11/1960 | McRuer et al. | ................ | 244/181 |
| 4,568,043 | A | * | 2/1986 | Schmittle | ......................... | 244/48 |
| 4,596,368 | A | * | 6/1986 | Schmittle | ......................... | 244/48 |
| 5,435,504 | A | * | 7/1995 | Inoue et al. | ....................... | 244/13 |
| 7,002,349 | B2 | * | 2/2006 | Barringer | ....................... | 324/330 |
| 2005/0230531 | A1 | * | 10/2005 | Horinouchi | ..................... | 244/47 |

* cited by examiner

*Primary Examiner* — Faye M. Fleming
(74) *Attorney, Agent, or Firm* — Perman & Green, LLP

(57) ABSTRACT

A method of determining a dynamic stability margin $M_{SD}$ of an aircraft includes calculating the longitudinal position $X_{MP}$ of a maneuver point MP to find the distance between the maneuver point and the position $X_{CG}$ of the aircraft center of gravity CG, as a function of the angular velocity $\omega_O$ of an incidence oscillation of the aircraft. A device for determining the dynamic stability margin $M_{SD}$ or a position $X_{MP}$ of the maneuver point MP includes means or acquisition of data and or calculating a dynamic stability margin. The means receive data for generating, the aircraft mass m and pitch inertia Iyy; the flight speed V; the angular velocity $\omega_O$ of the incidence oscillation at a flight point; a coefficient $C^*_\alpha$ representing $Cz_\alpha$ of a "quasi-static" model of the aircraft. The aircraft flight control laws may be adapted according to the stability margin and to $X_{MP}$.

7 Claims, 2 Drawing Sheets

METHOD AND DEVICE FOR DETERMINING THE DYNAMIC STABILITY MARGIN OF AN AIRCRAFT

CROSS-REFERENCE TO RELATED APPLICATION

This application claims priority to and the benefit of French Application No. 0755399 filed on Jun. 1, 2007.

BACKGROUND

The disclosed embodiments relate to the field of aircraft flight qualities.

In particular, the disclosed embodiments relate to the determination of the dynamic stability margin of an aircraft, a margin which determines the stability of the flight and the safety of in-flight maneuvers.

SUMMARY

For the needs of the present description, the notations used are the conventional notations in the field of the aerodynamics and flight qualities of aircraft.

These principles are reviewed in FIG. 1 which shows the principal reference axes of a conventional aircraft:
- an axis X corresponding to the longitudinal axis of the aircraft, oriented positively towards the front of the aircraft;
- an axis Z in the plane of symmetry of the aircraft, perpendicular to the X axis and oriented positively downwards with respect to the aircraft;
- an axis Y perpendicular to the plane of symmetry of the aircraft and oriented positively to the right of the aircraft.

The dynamic stability margin with which the disclosed embodiments are concerned relates to the longitudinal stability of the aircraft, that is to say essentially the rotational stability about a pitch axis, that is to say about an axis parallel with the Y axis of the aircraft's own reference axis system.

The movements of the aircraft about the pitch axis are controlled by a control surface called the elevator by modifying a deflection angle, referenced δq, of said control surface.

$S_{ref}$ represents a reference area of the aircraft, in general an area of the wing of the aircraft and $L_{ref}$ represents a reference length of the aircraft, in general the length of a mean aerodynamic chord, called mac of the wing of the aircraft. $S_{ref}$ and $L_{ref}$ are used in flight mechanics equations in order to make the coefficients or parameters used dimensionless.

In general, the dynamic stability margin of an aircraft is defined as a distance along the longitudinal axis X of the aircraft separating the center of gravity CG of the aircraft from a characteristic point MP called "maneuver point".

Letting $X_{CG}$ represent the distance along X from the center of gravity to a reference point X and $X_{MP}$ represent the distance along X from the maneuver point to the same point of reference, the distance from the center of gravity CG to the maneuver point MP is therefore $X_{CG}-X_{MP}$. In terms of the mean aerodynamic chord, the distance is therefore expressed $X_{CG}/L_{ref}-X_{MP}/L_{ref}$.

For given flight conditions, the maneuver point MP is in principle defined as the position along the longitudinal axis X which the center of gravity CG of the aircraft should have so that a vertical acceleration along a direction Z in the aircraft's reference axes, said vertical acceleration being most often divided by the acceleration g of the earth's field of gravity in order to be expressed in the non-dimensional form of a vertical load factor nz of the aircraft, is independent of the deflection angle δq of the elevator of the aircraft, this elevator being used in normal flight conditions for controlling the vertical load factor nz.

When the center of gravity CG is at the same position along the X direction as the maneuver point MP, the ratio δg/nz, sometimes called "deflection by g", is equal to zero, a situation in which the aircraft is no longer controllable. The determination of the dynamic stability margin and therefore of the position of the maneuver point therefore proves to be essential for safety reasons, the center of gravity having not to reach the maneuver point so that it is always possible to control the aircraft about the Y axis of rotation in pitch.

In a known way, the position of the maneuver point of an aircraft is determined theoretically, confirmed by flight tests and then the authorized range of the position in X of the center of gravity is defined by incorporating safety margins in order to take account of uncertainties in the evaluated position of the maneuver point MP.

If $$\left(\frac{X_F}{L_{ref}}\right)_\alpha$$

represents the reduced position of a neutral point of static stability in incidence α, the focus of incidence, in a known way the reduced position of the maneuver point is calculated using the equation:

$$\left(\frac{X_{MP}}{L_{ref}}\right)=\left(\frac{X_F}{L_{ref}}\right)_\alpha -\left(\frac{Cm_q}{\mu}\right) \qquad (10)$$

or by using the equation:

$$\left(\frac{X_{MP}}{L_{ref}}\right)=\left(\frac{X_F}{L_{ref}}\right)_\alpha -\left(\frac{Cm_q}{\mu - Cz_q}\right) \qquad (11)$$

equations in which Cmq represents the pitch moment coefficient due to the pitch speed, Czq represents the lift coefficient due to the pitch speed and p represents a reduced $$\mu = \left(\frac{2m}{\rho S_{ref} L_{ref}}\right),$$

mass: m representing in this case the mass of the aircraft and ρ the air density.

These equations are used considering that the aircraft is not deformable, the so-called rigid aircraft hypothesis, and that the coefficients Cmq and Czq are constant.

A disadvantage of these methods arises because the position obtained for the maneuver point is variable as a function of aircraft balance.

In practical cases, it is observed that, depending on the position of the center of gravity CG, the position obtained for the maneuver point MP varies by the order of 0.4% of the length Lref, which corresponds to about 2% of the authorized balance range of a conventional aircraft.

In order to overcome these difficulties, the method according to the disclosed embodiments determines the dynamic stability margin $M_{SD}$ of an aircraft in flight in which a position $X_{MP}$ along a longitudinal axis of the aircraft, called the X axis, of a maneuver point MP is calculated in order to find the distance between said maneuver point and a position $X_{CG}$ along the X axis of a center of gravity CG of the aircraft by the measurement of an angular velocity $\omega_O$ of an incidence oscillation of the aircraft.

More particularly, the position $X_{MP}$ is determined by the equation:

$$\left(\frac{X_{MP}}{L_{ref}}\right) = \left(\frac{X_{cg}}{L_{ref}}\right) - \left(\frac{I_{yy}}{mVL_{ref}}\right)\left(\frac{\omega_0^2}{C_\alpha^*}\right)$$

in which equation:
$L_{ref}$ is a reference length of the aircraft, the terms $X_{MP}/L_{ref}$ and $X_{CG}/L_{ref}$ representing reduced values of $X_{MP}$ and of $X_{CG}$ respectively;
$I_{yy}$ is the inertia of the aircraft about an axis of rotation in pitch parallel with an axis Y of the aircraft reference system perpendicular to a vertical plane of symmetry of the aircraft;
m is the mass of the aircraft;
V is the true aerodynamic speed of the aircraft at the point of flight in question for the measurement of the angular velocity $\omega_O$;
$C^*_\alpha$ is a coefficient of the status matrix [A] of a "quasi-static" model of the aircraft.

For the application of the method, a device able to determine the dynamic stability margin $M_{SD}$ of an aircraft and/or the position $X_{MP}$ of the maneuver point MP comprises first means of acquisition of data and of calculating the dynamic stability margin.

Said first means receive data corresponding to or sufficient for generating:
a current mass m of the aircraft;
a current inertia Iyy of the aircraft about an axis of rotation in pitch, parallel with an axis Y of the aircraft reference system perpendicular to a vertical plane of symmetry of the aircraft;
a current speed V, the true aerodynamic speed of the aircraft at the flight point in question;
an angular velocity $\omega_O$, of an incidence oscillation of the aircraft at the flight point in question;
a coefficient $C^*_\alpha$ of the status matrix of a "quasi-static" model of the aircraft.

Advantageously, the first means determine the dynamic stability margin as the result value, in a reduced form divided by a term Lref, where Lref represents a reference length of the aircraft, of the application of the formula:

$$\left(\frac{I_{yy}}{mVL_{ref}}\right)\left(\frac{\omega_0^2}{C_\alpha^*}\right)$$

The device preferably comprises second means of data acquisition and of calculating the position $X_{MP}$ of the maneuver point MP.

The second means receive data corresponding to or sufficient for generating a position $X_{CG}$ along the X axis of a center of gravity CG of the aircraft and determining the position $X_{MP}$ of the maneuver point MP as the result value, in a reduced form $X_{MP}/L_{ref}$ of the formula:

$$\left(\frac{X_{MP}}{L_{ref}}\right) = \left(\frac{X_{cg}}{L_{ref}}\right)$$

Reduced dynamic stability margin established by the first means

In order, notably, to generate alarms when the dynamic stability conditions deteriorate, the second means generate data depending on the difference between the value of the dynamic stability margin and one or more predetermined threshold values.

In order to improve the flight qualities of an aircraft, notably when normal piloting laws assuring certain protections are no longer active, an aircraft advantageously comprises a flight control system able to receive the data generated by the device for determining the dynamic stability margin and/or the maneuver point and to modify the piloting laws according to said received data.

The detailed description of the disclosed embodiments is given with reference to the figures in which:

DETAILED DESCRIPTION

Figure 1:
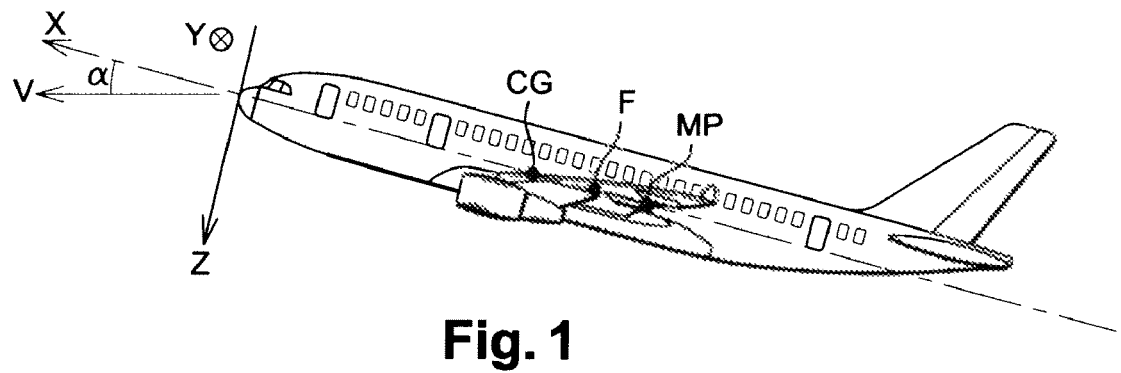
FIG. 1 shows the principal axes of the conventional reference system of an aircraft and corresponding notations.
Figure 2:
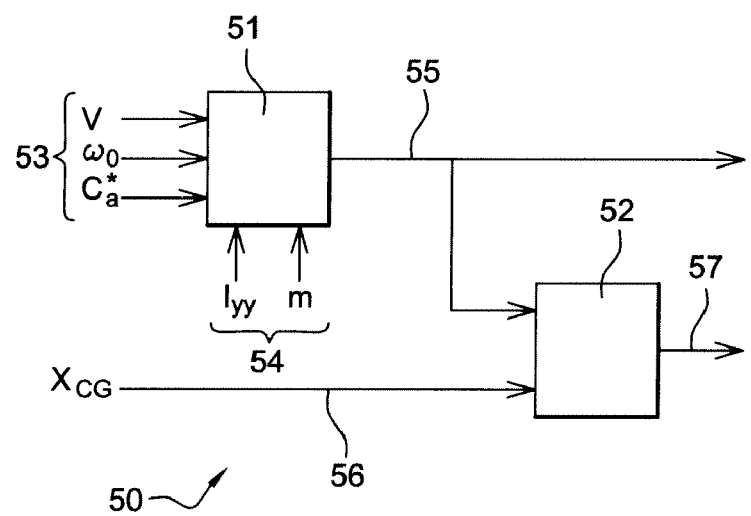
FIG. 2 shows a block diagram of a device according to the disclosed embodiments.
Figure 3:
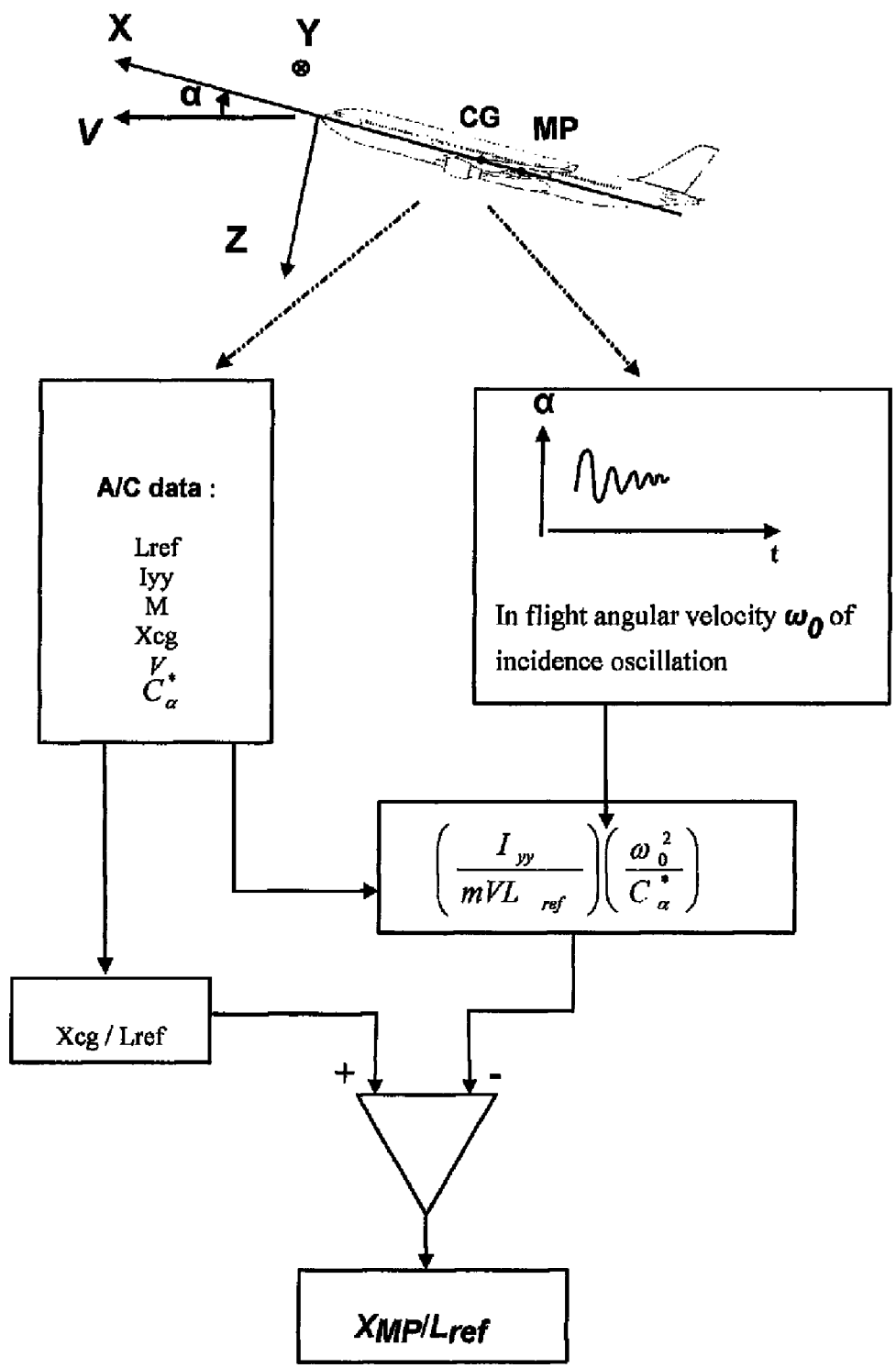
FIG. 3 illustrates a method for determining the dynamic stability margin MSD of an aircraft in flight.

According to the method of the disclosed embodiments a dynamic stability margin $M_{SD}$ along a longitudinal axis X of an aircraft is determined from a value of the angular velocity $\omega_O$ of an incidence oscillation.

The dynamic margin is defined as the distance along the X direction between the center of gravity CG of the aircraft and a maneuver point MP.

According to the method, characteristic coefficients of the aircraft in the current flight conditions are determined, a value of the angular velocity $\omega_O$ is established and the dynamic stability margin $M_{MD}$ is obtained by the equation:

$$M_{SD} = \left(\frac{X_{MP}}{L_{ref}}\right) = \left(\frac{X_{cg}}{L_{ref}}\right) + \left(\frac{L_{ref}}{V}\right)^2\left(\frac{\eta}{\mu}\right)\left(\frac{Cz_{\dot\alpha} + \mu}{Cz_\alpha}\right)\omega_0^2 \quad (9b)$$

an equation in which the symbols have the general significance given in the flight mechanics equations already explained or which will be explained later.

The formulation of the dynamic stability margin $M_{SD}$ as a function of the angular velocity $\omega_O$ is established on the basis of the general equations which govern the longitudinal movements of the aircraft.

In order to stabilize a maneuver corresponding to an increase of a vertical load factor by a value $\Delta n_z$, the aircraft sees an angle of incidence $\alpha$ of the wing modified by a value $\Delta\alpha$ and the deflection $\delta q$ of the elevators of the aircraft modified by a value $\Delta\delta q$.

The values $\Delta n_z$, $\Delta\alpha$ and $\Delta\delta q$ are related by the known flight mechanics equations:

$$\Delta\alpha = \left(\frac{gL_{ref}}{V^2}\right)\left(\frac{Cz_{\delta q}Cm_g + Cm_{\delta q}(\mu - Cz_q)}{Cz_\alpha Cm_{\delta q} - Cm_\alpha - Cz_{\delta q}}\right)\Delta n_z \quad (1a)$$

$$\Delta\delta q = -\left(\frac{gL_{ref}}{V^2}\right)\left(\frac{Cz_\alpha Cm_q + Cm_\alpha(\mu - Cz_q)}{Cz_\alpha Cm_{\delta q} - Cm_\alpha Cz_{\delta q}}\right)\Delta n_z \quad (1b)$$

equations in which conventionally in the field of aircraft aerodynamics calculations:

g represents the acceleration of the earth's gravitational field $L_{ref}$ represents a reference length of the aircraft such as a mean aerodynamic chord length of a wing;

V represents the relative speed of the airflow with respect to the aircraft;

μ represents a reduced mass of the aircraft according to the already described equation;

$Cz_{\delta q}$ represents the derivative $dCz/d\delta q$, Cz being a lift coefficient of the aircraft;

$Cm_q$ represents the derivative $dCm/dq$, Cm being a pitch moment coefficient of the aircraft and q being the pitch speed of the aircraft, that is to say the speed of rotation about a pitch axis parallel with the Y axis of the aircraft reference system, $Cz_q$ represents the derivative $dCz/dq$;

$Cm_\alpha$ represents the derivative $dCm/d\alpha$, Cm being a pitch moment coefficient and a an aerodynamic incidence of the aircraft;

$Cm_{\delta q}$ represents the derivative $dCm/d\delta q$;

$Cz_\alpha$ represents the derivative $dCz/d\alpha$.

All of these aerodynamic coefficients of the aircraft here being taken with respect to the center of gravity CG as in the rest of the description.

In accordance with the general definition, the maneuver point corresponds to the position of the center of gravity along the horizontal axis of the aircraft for which $$\left(\frac{\Delta\delta q}{\Delta n_z}\right) = 0$$

which makes it possible to establish from equations (1a) and (1b) when:

$$Cz_\alpha Cm_q + Cm_\alpha(\mu - Cz_q) = 0 \quad (2)$$

The position $X_{CG}$ ($X_{CG}/L_{ref}$ in reduced value) of the center of gravity CG for which this equation is true is derived from the knowledge of the values of each aerodynamic coefficient as a function of the position of the center of gravity.

The pitch moment coefficient $Cm_\alpha$ due to the incidence α and the lift coefficient $Cz_q$, due to the pitch speed q are functions of the position of the center of gravity.

In order to find a solution to the equation (2), the coefficient $Cm_q$ must also be identified as a function of the position of the center of gravity CG.

The pitch moment $Cm_q$ due to the pitch speed is expressed by the equation:

$$Cm_q = -Cz_\alpha\left(\left(\frac{X_{cg}}{L_{ref}}\right)^2 - \left(\frac{X_{cg}}{L_{ref}}\right)\left(\left(\frac{X_F}{L_{ref}}\right)_\alpha + \left(\frac{X_F}{L_{ref}}\right)_q\right) + \left(\frac{X_F}{L_{ref}}\right)^2_{\alpha,q}\right) \quad (3)$$

where $$\left(\frac{X_F}{L_{ref}}\right)_\alpha \text{ and } \left(\frac{X_F}{L_{ref}}\right)_q$$

respectively represent the reduced position of the neutral point of static stability, called the neutral point, and of the point of application of the forces induced by the pitch speed.

It must be noted that only the positions of the center of gravity CG and of the static stability neutral points and of maneuver points along the longitudinal axis X of the aircraft are used in this equation (3).

All the terms of this equation are known in the literature dealing with matters of stability and flight control of aircraft with the exception of the term $$\left(\frac{X_F}{L_{ref}}\right)_{\alpha,q}$$

which, to the knowledge of the inventor, is not revealed by published documents.

It is also known that the pitch moment $Cm_\alpha$ due to the angle of incidence is expressed as $$Cm_\alpha = Cz_\alpha\left(\left(\frac{X_{cg}}{L_{ref}}\right) - \left(\frac{X_F}{L_{ref}}\right)_\alpha\right)$$

and that the lift gradient $Cz_q$ due to the pitch speed is expressed as $$Cz_q = -Cz_\alpha\left(\left(\frac{X_{cg}}{L_{ref}}\right) - \left(\frac{X_F}{L_{ref}}\right)_q\right).$$

By bringing into the equation (2) the expression of the pitch moment $Cm_q$ due to the pitch speed by its expression (3), a new expression of the value of $X_{MP}$ ($X_{MP}/L_{ref}$ in reduced value) is obtained:

$$\left(\frac{X_{MP}}{L_{ref}}\right) = \left(\frac{X_F}{L_{ref}}\right)_\alpha + \left(\frac{Cz_\alpha}{\mu}\right)\left(\left(\frac{X_F}{L_{ref}}\right)^2_{\alpha,q} - \left(\frac{X_F}{L_{ref}}\right)_\alpha\left(\frac{X_F}{L_{ref}}\right)_q\right) \quad (4)$$

in which μ is the previously expressed reduced mass.

The comparison of the aerodynamic gradient with the neutral point therefore results in $$\left(\frac{X_{MP}}{L_{ref}}\right) = \left(\frac{X_F}{L_{ref}}\right)_\alpha - \left(\frac{1}{\mu Cz_\alpha}\right)(Cz_\alpha Cm_q - Cm_\alpha Cz_q) \quad (5)$$

In the hypothesis of a rigid aircraft (at a given point of flight), it is derived from the equation (4) that the position of the maneuver point in the aircraft reference system is independent of the position of the center of gravity, which implies that the last term in parenthesis in the preceding equation (5) is constant, that is to say that:

$$Cz_\alpha Cm_q - Cm_\alpha Cz_q = C_0 \quad (6)$$

However, the position of the center of gravity CG is better known in practice than is the data of the neutral point and the determination of the maneuver point MP in the rigid aircraft hypothesis is preferably established using the equation:

$$\left(\frac{X_{MP}}{L_{ref}}\right) = \left(\frac{X_{cg}}{L_{ref}}\right)_\alpha - \left(\frac{1}{\mu Cz_\alpha}\right)(Cz_\alpha Cm_q + Cm_\alpha(\mu - Cz_q)) \quad (7)$$

It is known that an aircraft in flight subjected to a disturbance, for example a vertical disturbance or a pitch disturbance, is naturally subjected to movements having an oscillation in incidence corresponding to a pitch movement of the aircraft with a relatively short main angular velocity period $\omega_O$.

This link is determined by a root of a rigid or "quasi-static" aircraft model and is expressed in a known way by the equation:

$$\omega_0^2 = -\left(\frac{V}{L_{ref}}\right)^2 \left(\frac{Cm_q Cz_\alpha + Cm_\alpha(\mu - Cz_q)}{\eta(Cz_{\dot\alpha} + \mu)}\right) \quad (8)$$

in which expression $\eta$ is a reduced inertia $$\eta = \left(\frac{2I_{yy}}{\rho S_{ref} L_{ref}^3}\right)$$

of an inertia Iyy of the aircraft about a pitch rotation axis parallel with the Y axis of the aircraft reference system, and in which expression Cz represents the derivative $dCz/d\dot\alpha$ of Cz with respect to the speed $\dot\alpha$ of variation of the incidence $\alpha$.

An expression of the maneuver point as a function of the first angular velocity $\omega_O$ of the incidence oscillation mode of the aircraft is derived from the equations (7) and (8):

$$\left(\frac{X_{MP}}{L_{ref}}\right) = \left(\frac{X_{cg}}{L_{ref}}\right) + \left(\frac{L_{ref}}{V}\right)^2 \left(\frac{\eta}{\mu}\right)\left(\frac{Cz_{\dot\alpha}+\mu}{Cz_\alpha}\right)\omega_0^2 \quad (9)$$

In this latter equation it is observed that the angular velocity $\omega_O$ of the incidence oscillation mode is proportional to the distance between the center of gravity and the maneuver point and is not proportional to the distance between the center of gravity and the neutral point.

When $\omega_O$ is equal to zero, this signifies that the center of gravity CG has reached the maneuver point MP or that the maneuver point has reached the center of gravity.

The equation (9) therefore gives an expression of the dynamic stability margin of the aircraft.

A derived and equivalent expression of the dynamic stability margin is also expressed as follows:

$$\left(\frac{X_{MP}}{L_{ref}}\right) = \left(\frac{X_{cg}}{L_{ref}}\right) - \left(\frac{I_{yy}}{mVL_{ref}}\right)\left(\frac{\omega_0^2}{C_\alpha^*}\right) \quad (9a)$$

in which expression:

$C^*_\alpha$ is a coefficient of the status matrix [A] of the "quasi-static" model of the aircraft given by:

$$[A] = \begin{bmatrix} C_\alpha^* & C_q^* \\ D_\alpha^* & D_q^* \end{bmatrix}$$

Said term $C^*_\alpha$ representative of $Cz_\alpha$ of the aircraft whose value is advantageously determined at a given flight point from measurements carried out during the flight.

$\omega_O$ is the natural frequency of oscillation in incidence of the first oscillation mode for a rigid aircraft with:

$$\omega_O^2 = C^*_\alpha D^*_q - D^*_\alpha C^*_q$$

An advantage of the expression (9a) is the possibility of calculating more easily, in certain digital simulations, a linearized "quasi-static" model delivering the matrix [A] and it is then possible to calculate during the course of the flight, for each flight point and for each aircraft mass, the dynamic stability margin $M_{SD}$ from the measurement of the angular velocity $\omega_O$, a value easily obtained by in-flight measurements by means of systems such as gyrometers or accelerometers used in the aircraft for example in inertial systems.

According to the proposed method, aerodynamic coefficients of the aircraft, the mass of the aircraft and the inertia Iyy are determined in a first step by conventional methods and means for given flight conditions.

In a second step, the angular velocity $\omega_O$ of the incidence oscillation, triggered by a natural disturbance or by a provoked disturbance, is measured at the point of flight in question.

Finally, in a third step, the position of the maneuver point MP along the X axis and/or the dynamic stability margin $M_{SD}$ are calculated using one of the equations (9) or (9a) or (9b).

An advantage of the method relates to the method itself which uses for the determination of the sought margin a parameter, $\omega_O$, whose measurement is very accessible with great accuracy, which is not the case for the parameters necessary for the application of the known methods.

Another advantage of the method is an improved accuracy of the determination of the position of the maneuver point and of the sought margin.

Another advantage of the method is the absence of sensitivity of the position of the maneuver point to the position of the center of gravity of the aircraft, which conforms with theory and which is not the case of the known methods.

These advantages of the proposed method in comparison with the known methods emerge from the comparison of the expressions (10) and (11) used in the known methods with those established for the requirements of the method according to the disclosed embodiments.

The equation (5), seen previously, is also expressed in the form:

$$\left(\frac{X_{MP}}{L_{ref}}\right) = \left(\frac{X_F}{L_{ref}}\right)_\alpha - \left(\frac{Cm_q}{\mu}\right) + \left(\frac{Cm_\alpha Cz_q}{\mu Cz_\alpha}\right) \quad (12)$$

which makes it possible to establish that the known expression (10) is an approximation in which the term $$\left(\frac{Cm_\alpha Cz_q}{\mu Cz_\alpha}\right)$$

is disregarded.

In practice, this term is legitimately disregarded when the static margin becomes small, i.e. $Cm_\alpha \approx 0$.

However, when this term is disregarded in the equation (12) the position of the maneuver point obtained is dependent on the position of the center of gravity.

On way of making the determination of the position of the maneuver point independent of the position of the center of gravity in this expression consists in considering that $Cm_q$ is constant, which is not satisfactory for the accuracy of the results such as can be obtained from the expression (3).

The second known expression (11) is obtained from the expression (2) defining the maneuver point by assuming that the pitch moment $Cm_q$ due to the pitch speed and the lift gradient $Cz_q$ due to the pitch speed are independent of the position of the center of gravity, which results in considering that $$\left(\frac{Cm_\alpha}{Cz_\alpha}\right)(\mu - Cz_q) = -Cm_q.$$

The equation (11) is therefore derived from the expression of $Cm_\alpha$.

Because of the hypothesis considering $Cm_q$ and $Cz_q$ as constant, the expressions (10) and (11) result in less precise estimations of the position of the maneuver point than those obtained by the equation (5).

These results will be better appreciated on analysis of the following numerical examples of calculation of the position of the maneuver point of a civil transport aircraft.

In order to compare the results obtained using the methods proposed by the prior art and by the disclosed embodiments, ((10), (11), (7)), it is convenient to consider a first "quasi-static" aircraft model (in which the effects of static flexibility are taken into consideration) in the case of a rear balancing at the point of flight defined by:

| a flight Mach number | M = 0.515 |
| a true airspeed: | V = 175 (m/s) |
| an altitude: | H = 0 (ft) |
| a position of the center of gravity | $X_{cg}$ = 43.9 (%) mac |

In the considered example and with these conditions, the values of the aerodynamic coefficients are:

| Aircraft coefficient | Rigid | "quasi-static" |
| --- | --- | --- |
| $Cz_\alpha$ | 5.4388 | 4.7759 |
| $Cm_\alpha$ | −0.2732 | 0.1648 |
| $Cz_q$ | 3.9685 | 3.1271 |
| $Cz_q$ | −6.2636 | −5.0289 |

The position obtained for the maneuver point by using the different methods is therefore:

| Method defined by | Rigid aircraft | "Quasi-static" aircraft |
| --- | --- | --- |
| Equation (10) | 55.907 (%) mac | 46.038 (%) mac |
| Equation (11) | 56.240 (%) mac | 46.247 (%) mac |
| Proposed equation (5) | 55.682 (%) mac | 46.16 (%) mac |

It emerges from these examples that the various methods give different results.

If a case of flight of the same aircraft differing only by the position of the center of gravity placed in a forward position in comparison with the preceding case is considered:

center of gravity $X_{cg}$=36.72(%)mac the aerodynamic coefficients to be taken into consideration are then:

| Aircraft coefficient | Rigid | "quasi-static" |
| --- | --- | --- |
| $Cz_\alpha$ | 5.4388 | 4.8316 |
| $Cm_\alpha$ | −0.6583 | −0.2051 |
| $Cz_q$ | 4.3536 | 3.4903 |
| $Cz_q$ | −6.5899 | −5.2809 |

The position obtained for the maneuver point by using the different methods is therefore:

| Method defined by | Rigid aircraft | "quasi-static" aircraft |
| --- | --- | --- |
| Equation (10) | 56.278 (%)mac | 46.938 (%) mac |
| Equation (11) | 56.664 (%) mac | 47.184 (%) mac |
| Proposed equation (5) | 55.682 (%) mac | 46.77 (%) mac |

The comparison of the results obtained for the two different balances shows that the equation (5) of the disclosed embodiments gives exactly the same position of the maneuver point in the case of the rigid aircraft hypothesis, which is not the case with the known equations (10) and (11).

Thus, the method according to the disclosed embodiments gives, unlike the known methods, results for the position of the maneuver point which are independent of the position of the center of gravity.

In the "quasi-static" aircraft hypothesis, the method of the disclosed embodiments gives slightly different results as a consequence of the effects on the "quasi-static" model of the differences in the distribution of the aircraft masses.

The differences are however much greater for the known methods.

The dynamic stability margin based on the equation (9a) is established by considering a case of rear balance with the following aircraft flight conditions:

| Mach Number | M = 0.5 |
| True air speed | v = 175 (m/s) |
| Mass | m = 560 (t) |
| Inertia | $I_{yy}$ = 74000000 (kg m$^2$) |
| Balance | $X_{cg}$ = 43.8 (%) mac |

In these conditions, the status matrix [A] is:

$$[A] = \begin{bmatrix} -0.8081 & 0.9734 \\ 0.3637 & -1.5426 \end{bmatrix}$$

and according to the equation giving the angular velocity of the incidence oscillation $$\omega_O^2 = C^*_\alpha D^*_q - D^*_\alpha C^*_q,$$

said angular velocity is $$\omega_O^2 = 0.89 (rad/s)^2,$$

which results in a position of the maneuver point with respect to the center of gravity of:

$$X_{MP} = 50.63 (\%) mac$$

In this case of the position of the center of gravity, the center of gravity is therefore situated forwards along the X axis from the maneuver point and therefore a dynamically stable aircraft with a dynamic stability margin $M_{SD}$ equal to 6.83% (50.63−43.8) of the mac.

The method according to the disclosed embodiments, by using a new expression of the pitch coefficient $Cm_q$ due to the pitch speed, makes it possible to determine the position of the maneuver point and the dynamic stability margin of an aircraft in flight by measurement means that are precise and easily accessible without exhibiting the limitations of the known methods.

Advantageously, the method is used during test flights in the context of the verifications necessary for establishing the flight manual and for the certification of an aircraft.

In an application on board an aircraft in operation, a device 50 using the method makes it possible to determine the dynamic stability margin in flight, in particular in the case of flight control functioning with open loop servo-controls either due to design or because of a degraded operating mode.

Such a device 50 advantageously comprises first means 51 of data acquisition and for determination of the position of the maneuver point.

The necessary data can be considered in two families.

The first family 53 corresponds to the characteristic data of the point of flight, they are for example data on speed coming from sensors on the aircraft, on the angular velocity of the incidence oscillation and generated data, for example the status coefficient $C^*_\alpha$.

A second family 54 corresponds to data relating to the aircraft itself and not directly related to the point of flight. These data notably correspond to the mass m of the aircraft and to its inertia about the pitch axis, this data having to be generated as a function of the distribution of masses which is most often variable in flight.

The data of the first and second families are transmitted by any communication means between the systems of the aircraft, in particular by digital communication buses. The data itself is most often data transmitted by more or less specialized means of the aircraft which continuously generate this type of data from primary information.

From the data thus received or generated locally, the first means 51 determine the position $X_{MP}$ of the maneuver point according to the method of the disclosed embodiments and this position 55 is transmitted to a second means 52 which receives information $X_{CG}$ on the position of the center of gravity.

Said second means then generate a dynamic stability margin and, if necessary, alarms which are transmitted 57 to devices for the display of information (not shown) and/or to flight control devices (not shown) whose control law gains are modified if necessary as a function of the dynamic stability margin.

In this case real time knowledge of dynamic stability margin is advantageously used by a flight control device for acting on the piloting gains in order to limit the consequences of a reduced stability margin and in order to trigger alarms for a crew flying the aircraft in order to inform said crew when the dynamic stability margin is below a predefined threshold value.

The invention claimed is:

1. A method for determining the dynamic stability margin $M_{SD}$ of an aircraft in flight in which a position $X_{MP}$ along a longitudinal X axis of the aircraft of a maneuver point MP is calculated in order to find the distance between said maneuver point and a position $X_{CG}$ along the longitudinal X axis of a center of gravity CG of the aircraft, wherein the position $X_{MP}$ along the longitudinal X axis of said maneuver point MP is determined as a function of an angular velocity $\omega_O$ of an incidence oscillation of the aircraft, said angular velocity $\omega_O$ being measured during the flight of the aircraft.

2. A method according to claim 1, wherein the position $X_{MP}$ is determined by the equation:

$$\left(\frac{X_{M_P}}{L_{ref}}\right) - \left(\frac{X_{cg}}{L_{ref}}\right) - \left(\frac{I_{yy}}{mVL_{ref}}\right)\left(\frac{\omega_0^2}{C^*_\alpha}\right)$$

in which equation:
$L_{ref}$ is a reference length of the aircraft, the terms $X_{MP}/L_{ref}$ and $X_{CG}/L_{ref}$ representing reduced values of $X_{MP}$ and of $X_{CG}$ respectively;
$I_{yy}$ is an inertia of the aircraft about an axis of rotation in pitch parallel with an axis Y of the aircraft reference system perpendicular to a vertical plane of symmetry of the aircraft;
m is a mass of the aircraft;
V is a speed representing the true aerodynamic speed of the aircraft at the point of flight in question for the measurement of the angular velocity $\omega_O$;
$C^*_\alpha$ is a coefficient of the status matrix [A] of a "quasi-static" model of the aircraft.

3. A device able to determine a dynamic stability margin MSD of an aircraft and/or a position XMP along a longitudinal axis of the aircraft, called the X axis, of a maneuver point MP, wherein said device comprises first means of acquisition of data and of calculating the dynamic stability margin MSD, said first means receiving data corresponding to or sufficient for generating:
a current mass m of the aircraft;
a current inertia Iyy of the aircraft about an axis of rotation in pitch, parallel with an axis Y of the aircraft reference system perpendicular to a vertical plane of symmetry of the aircraft;
a current true aerodynamic speed V of the aircraft at the flight point in question;
an angular velocity $\omega_O$ of an incidence oscillation of the aircraft at the flight point in question;
a coefficient $C^*_\alpha$ of a status matrix [A] of a "quasi-static" model of the aircraft.

4. A device according to claim 3, wherein the first means determine the dynamic stability margin $M_{SD}$, in a reduced form divided by a term Lref, where Lref represents a reference length of the aircraft, by application of:

$$M_{SD} = \left(\frac{I_{yy}}{mVL_{ref}}\right)\left(\frac{\omega_0^2}{C^*_\alpha}\right).$$

5. A device according to claim 3 comprising second means of data acquisition and of calculating the position $X_{MP}$, of the maneuver point MP, said second means receiving data corresponding to or sufficient for generating a position $X_{CG}$ along the X axis of a center of gravity CG of the aircraft and determining the position $X_{MP}$ of the maneuver point MP as a result value, in a reduced form $X_{MP}/L_{ref}$, where $L_{ref}$ is a reference length of the aircraft, by application of:

$$\left(\frac{X_{MP}}{L_{ref}}\right) = \left(\frac{X_{cg}}{L_{ref}}\right) - \{\text{Reduced dynamic stability margin established by the first means (of acquisition of data)}\}.$$

6. A device according to claim 5, wherein the second means of data acquisition and of calculating the position XMP generate data depending on the difference between the value of the dynamic stability margin $M_{SD}$ and one or more predetermined threshold values.

7. An aircraft comprising a flight control device able to receive the data generated by the device according to claim 3 and to modify piloting laws of said flight control device according to received data.

* * * * *